United States Patent
Sugata

(10) Patent No.: US 9,925,661 B2
(45) Date of Patent: Mar. 27, 2018

(54) METHOD FOR CONTROLLING WEARABLE ROBOT

(71) Applicant: TOYOTA JIDOSHA KABUSHIKI KAISHA, Toyota-shi, Aichi-ken (JP)

(72) Inventor: Hikaru Sugata, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 90 days.

(21) Appl. No.: 14/850,019

(22) Filed: Sep. 10, 2015

(65) Prior Publication Data

US 2016/0151907 A1  Jun. 2, 2016

(30) Foreign Application Priority Data

Dec. 1, 2014 (JP) .................................. 2014-243540

(51) Int. Cl.
 *B25J 9/00* (2006.01)
 *A61H 1/02* (2006.01)
 *A61H 3/00* (2006.01)

(52) U.S. Cl.
 CPC ............ *B25J 9/0006* (2013.01); *A61H 1/024* (2013.01); *A61H 3/00* (2013.01); *A61H 2201/1215* (2013.01); *A61H 2201/164* (2013.01); *A61H 2201/165* (2013.01); *A61H 2201/5061* (2013.01); *A61H 2201/5097* (2013.01); *Y10S 901/28* (2013.01); *Y10S 901/46* (2013.01)

(58) Field of Classification Search
 CPC ........ B25J 9/0006; B25J 9/1697; B25J 9/163; B25J 9/0003; B25J 11/0005; B25J 13/00; B25J 13/003; B25J 19/023; A61H 1/0237; A61H 1/024; A61H 1/0244; A61H 3/00
 See application file for complete search history.

(56) References Cited

U.S. PATENT DOCUMENTS

2013/0310979 A1* 11/2013 Herr .................... B62D 57/032
                                                    700/258

FOREIGN PATENT DOCUMENTS

JP   2011-218026 A   11/2011
JP   2013-138793 A   7/2013

* cited by examiner

*Primary Examiner* — Adam R Mott
(74) *Attorney, Agent, or Firm* — Oliff PLC

(57) ABSTRACT

The method for controlling the wearable robot according to one aspect of the present invention is attached to a joint part of the user, the robot joint being controlled in such a way that, when an angle $\theta 1$ of the robot joint (joint part 4) exceeds a predetermined allowable angle range R, the angle $\theta 1$ of the robot joint is made to go back within the allowable angle range R. When the robot joint is controlled to make the angle $\theta 1$ of the robot joint back within the allowable angle range R and the angle $\theta 1$ of the robot joint reaches a predetermined angle $\theta 2$, torque is generated in the robot joint to keep the angle $\theta 2$ of the robot joint at the predetermined angle $\theta 1$ for a predetermined period of time T.

2 Claims, 7 Drawing Sheets

METHOD FOR CONTROLLING WEARABLE ROBOT

INCORPORATION BY REFERENCE

This application is based upon and claims the benefit of priority from Japanese patent application No. 2014-243540, filed on Dec. 1, 2014, the disclosure of which is incorporated herein in its entirety by reference.

BACKGROUND OF THE INVENTION

1. Field of the Invention

The present invention relates to a method for controlling a wearable robot, and more particularly, to a method for controlling a wearable robot attached to a joint part of a user.

2. Description of Related Art

In recent years, a wearable robot attached to a joint part such as a waist or a knee of a user has been developed and trials regarding its use have been conducted at working sites or rehabilitation sites. In such a wearable robot, a robot joint needs to be controlled so that the angle of the joint part of the user is within a given allowable angle range.

For example, Japanese Unexamined Patent Application Publication No. 2013-138793 discloses a wearable robot in which, when the angle of a robot joint (that is, the angle of a joint part of a user) goes outside of a given allowable angle range, the robot joint is controlled so that the angle of the robot joint is made to go back within the allowable angle range.

According to the wearable robot disclosed in Japanese Unexamined Patent Application Publication No. 2013-138793, when the angle of the robot joint is made to go back within the allowable angle range, the control to make the angle of the robot joint go back within the allowable angle range is ended, whereby the user is able to freely operate the joint part.

At this time, however, once a person starts a motion to move the joint part in one direction, the person cannot immediately stop the motion to move the joint part even when the angle of the joint part of the user is forced to go back within the allowable angle range. Therefore, the angle of the joint part of the user again goes outside of the allowable angle range. Such an operation is repeated, as shown in FIG. 7, at the boundary between the inside and the outside of the allowable angle range, which generates so-called hunting (oscillation) and thus makes the user feel uncomfortable.

SUMMARY OF THE INVENTION

The present invention has been made in order to solve such a problem and aims to provide a method for controlling a wearable robot capable of suppressing the occurrence of so-called hunting and allowing a user to comfortably use the wearable robot.

A method for controlling a wearable robot according to one aspect of the present invention is a method for controlling a wearable robot that is attached to a joint part of a user, the robot joint being controlled in such a way that, when an angle of the robot joint exceeds a predetermined allowable angle range, the angle of the robot joint is made to go back within the allowable angle range, in which, when the robot joint is controlled to make the angle of the robot joint back within the allowable angle range and the angle of the robot joint reaches a predetermined angle, torque is generated in the robot joint to keep the angle of the robot joint to the predetermined angle for a predetermined period of time.

In the above method for controlling the wearable robot, the predetermined angle is preferably an angle at a boundary between an inside and an outside of the allowable angle range.

As described above, it is possible to provide a method for controlling a wearable robot capable of suppressing the occurrence of so-called hunting and allowing a user to comfortably use the wearable robot.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the accompanying drawings, best modes to achieve the present invention will be described. It should be noted that the present invention is not limited to the following embodiments. Further, for the sake of clarity of the description, the following description and the drawings are simplified as appropriate.

First Embodiment

Figure 1:
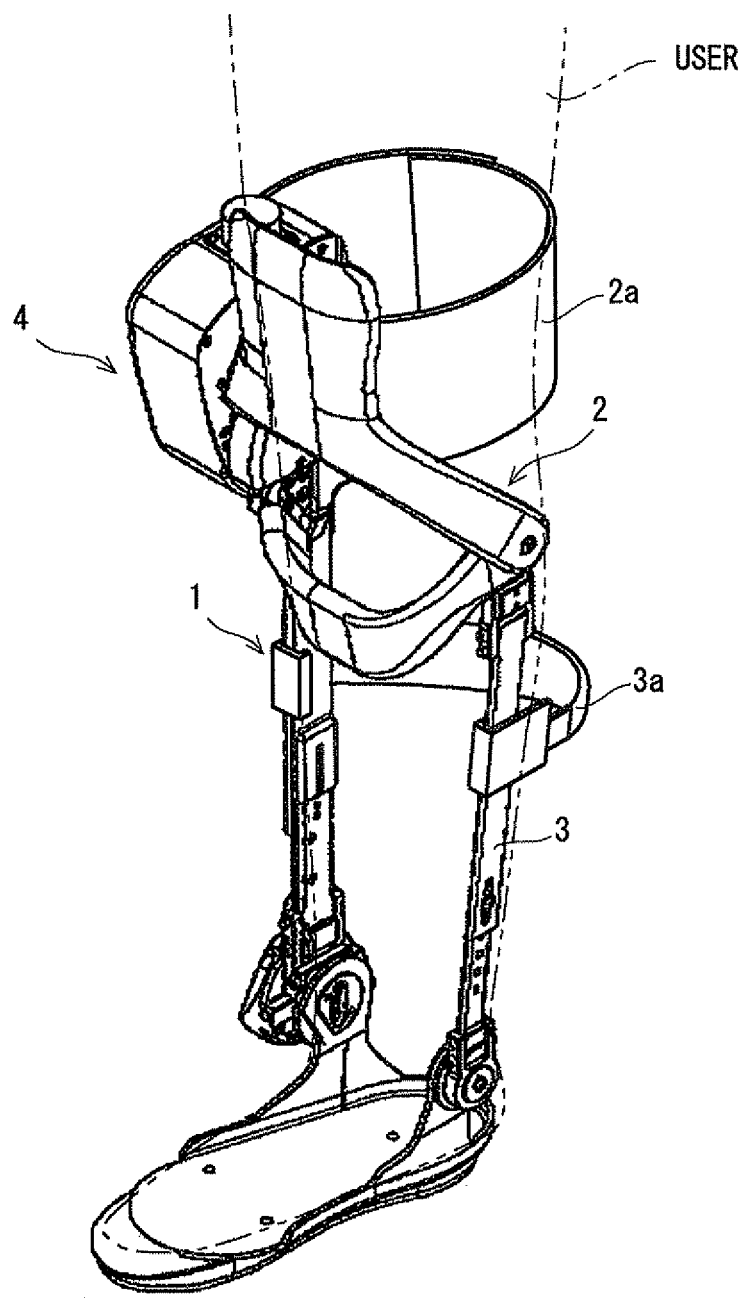
FIG. 1 is a view schematically showing a state in which a wearable robot according to a first embodiment is attached to a knee of a user.

First, a basic configuration of a wearable robot according to this embodiment will be described. FIG. 1 is a view schematically showing a state in which the wearable robot according to this embodiment is attached to a knee of a user.

Since a wearable robot 1 as shown in FIG. 1 has a basic configuration similar to that of a typical wearable robot, it will be briefly explained. The wearable robot 1 includes a first link 2 fixed to the thigh part of the user through a fixing band 2a and a second link 3 fixed to the shank part of the user through a fixing band 3a rotated around a shaft extending in the horizontal directions of the wearable robot 1 relative to each other due to a driving force of a joint part (robot joint) 4, thereby assisting a motion of the knee of the user.

Figure 2:
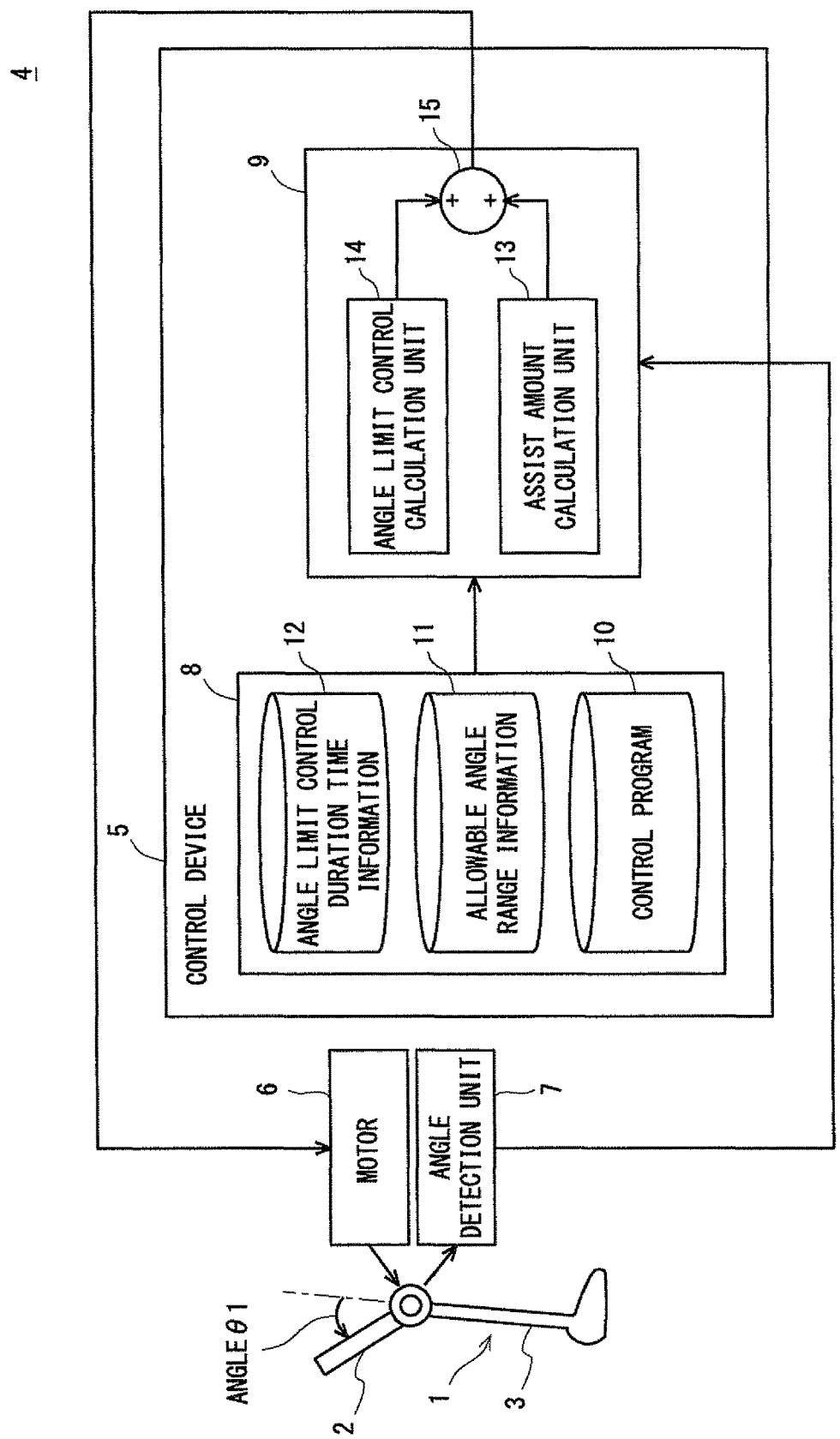
FIG. 2 is a block diagram showing a control system of the wearable robot according to the first embodiment.
Figure 3:
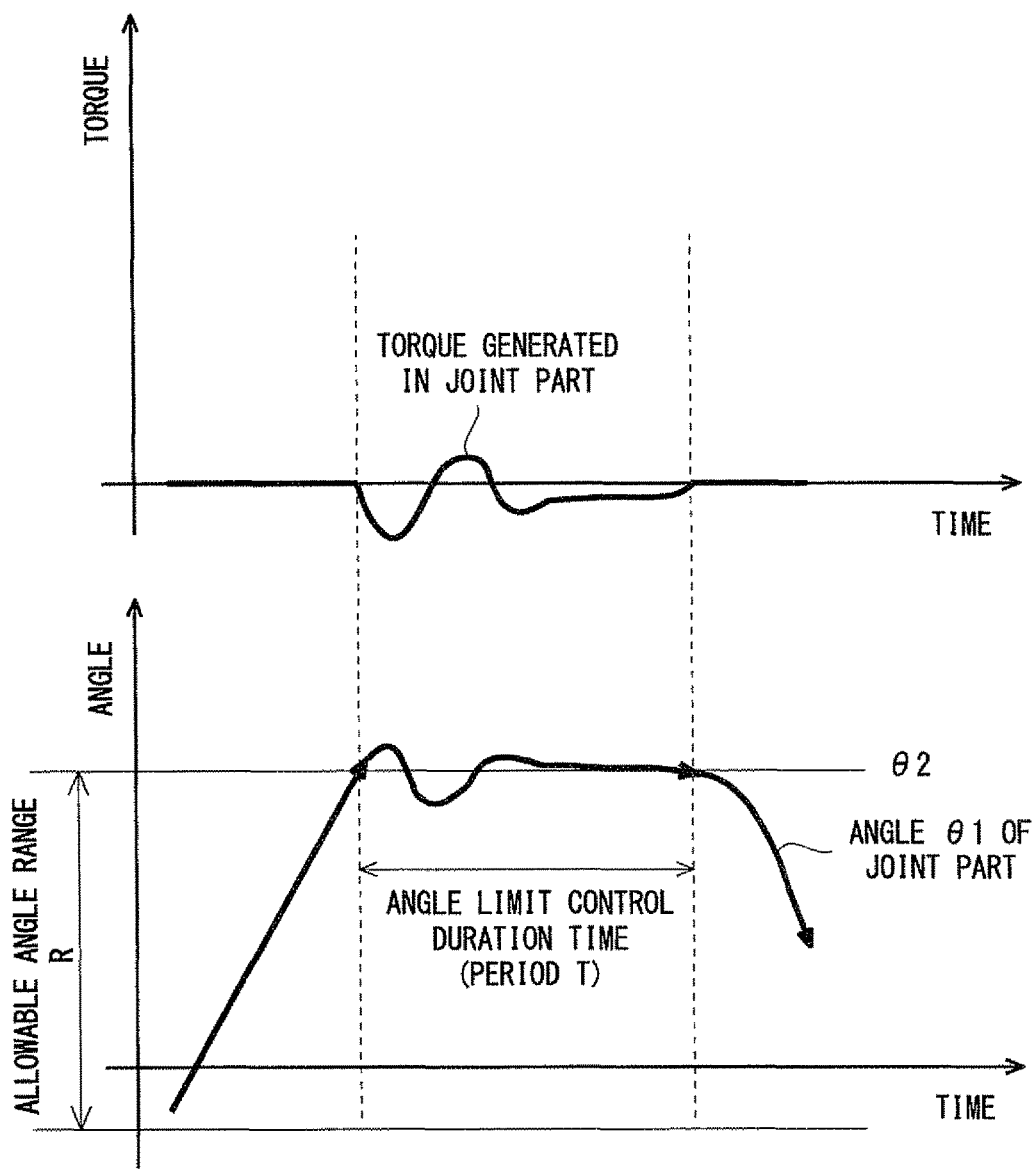
FIG. 3 shows a relation between torque of a joint part of the wearable robot and an angle of the joint part with respect to time in the wearable robot according to the first embodiment.

Next, a control system of the wearable robot according to this embodiment will be described. FIG. 2 is a block diagram showing a control system of the wearable robot according to this embodiment. FIG. 3 is a diagram showing a relation between torque of the joint part of the wearable robot and an angle of the joint part with respect to time.

As shown in FIG. 2, the joint part 4 includes a control device 5, a motor 6, and an angle detection unit 7. The control device 5 generates a control signal to cause the motor 6 to generate a given torque based on an angle $\theta 1$ of the joint part 4 detected by the angle detection unit 7 (that is, rotation angle of the first link 2 with respect to the second link 3) and the motor 6 operates based on the control signal that is generated, whereby the first link 2 and the second link 3 rotate relative to each other. While the control device 5 is installed in the joint part 4 in this embodiment, the control device 5 may be provided separately from the joint part 4.

The control device 5 includes a storage unit 8 such as a read only memory (ROM) or a random access memory (RAM) and a calculation unit 9 such as a central processing unit (CPU) and generates the control signal of the motor 6 based on a detection signal indicating the angle $\theta 1$ of the joint part 4 input from the angle detection unit 7.

The storage unit 8 stores a control program 10, allowable angle range information 11, angle limit control duration time information 12 and the like. The control program 10 is a program that is executed to achieve the control of the wearable robot 1. The allowable angle range information 11 is information regarding the allowable angle range of the joint part 4. For example, the upper-limit angle is set to 0.0 rad and the lower-limit angle is set to −2.0 rad. The angle limit control duration time information 12 is information regarding a period T to keep the angle $\theta 1$ of the joint part 4 to a predetermined angle $\theta 2$. The period T is set to, for example, 0.1 seconds. The allowable angle range information 11 and the angle limit control duration time information 12 may be changed as needed.

The calculation unit 9 includes an assist amount calculation unit 13, an angle limit control calculation unit 14, and an adding unit 15. The assist amount calculation unit 13 calculates a control torque value of the motor 6 based on the control program 10 and the allowable angle range information 11 read out from the storage unit 8 to execute a normal assist operation based on the detection signal input from the angle detection unit 7.

More specifically, when the angle $\theta 1$ of the joint part 4 detected by the angle detection unit 7 is within an allowable angle range R indicated by the allowable angle range information 11 (within the allowable angle range R), the assist amount calculation unit 13 calculates the control torque value of the motor 6 so that the angle $\theta 1$ of the joint part 4 becomes a predetermined angle. For example, when the leg part of the user is in a standing leg state (ground-contact state), the assist amount calculation unit 13 calculates the control torque value of the motor 6 to prevent the user from collapsing onto his/her knee. When the leg part of the user is in an idling leg state (state in which it is removed from contact with the ground), the assist amount calculation unit 13 calculates the control torque value of the motor 6 to allow the user to kick out or draw back the leg part.

On the other hand, the assist amount calculation unit 13 calculates the control torque value of the motor 6 so that the angle $\theta 1$ of the joint part 4 is made to go back within the allowable angle range R when the angle $\theta 1$ of the joint part 4 detected by the angle detection unit 7 exceeds the allowable angle range R.

The angle limit control calculation unit 14 executes the angle limit control based on the control program 10, the allowable angle range information 11, and the angle limit control duration time information 12 read out from the storage unit 8. While the details of the operation in the angle limit control calculation unit 14 will be described later, when the angle $\theta 1$ of the joint part 4 detected by the angle detection unit 7 exceeds the allowable angle range R indicated by the allowable angle range information 11, the angle limit control calculation unit 14 calculates the control torque value of the motor 6 so that the angle $\theta 1$ of the joint part 4 goes back within the allowable angle range R, and when the angle $\theta 1$ of the joint part 4 reaches the predetermined angle $\theta 2$, the angle limit control calculation unit 14 calculates the control torque value of the motor 6 to keep the angle $\theta 1$ of the joint part 4 at the angle $\theta 2$ during the period T indicated by the angle limit control duration time information 12.

The adding unit 15 adds the control torque value of the motor 6 calculated by the assist amount calculation unit 13 to the control torque value of the motor 6 calculated by the angle limit control calculation unit 14.

The above control device 5 generates a control signal by, for example, an amplifier (not shown) to cause the motor 6 to generate a control torque value calculated by the adding unit 15 to control the motor 6.

Figure 4:
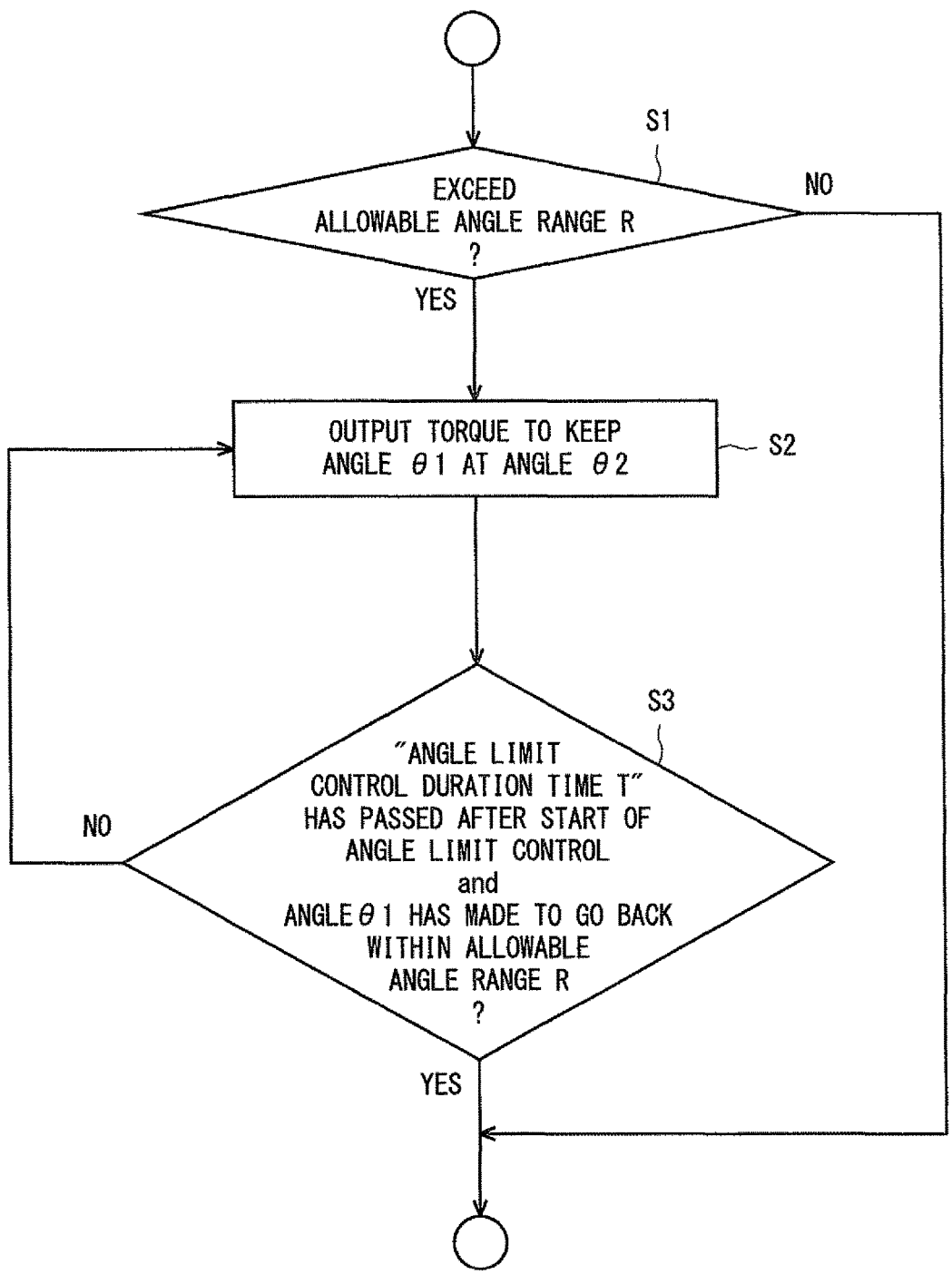
FIG. 4 is a flowchart showing a flow of an angle limit control in an angle limit control calculation unit.

Next, a flow of the angle limit control in the angle limit control calculation unit 14 will be described. FIG. 4 is a flowchart showing a flow of the angle limit control in the angle limit control calculation unit. While the description of an assist control in the assist amount calculation unit 13 will be omitted in the following description, the assist control in the assist amount calculation unit 13 is executed in parallel with the angle limit control in the angle limit control calculation unit 14.

First, the angle limit control calculation unit 14 determines whether the angle $\theta 1$ of the joint part 4 exceeds the allowable angle range R based on the detection signal input from the angle detection unit 7 (S1). When the angle $\theta 1$ of the joint part 4 is within the allowable angle range R (NO in S1), the angle limit control calculation unit 14 goes back to the process of S1.

When the angle $\theta 1$ of the joint part 4 exceeds the allowable angle range R (YES in S1), the angle limit control calculation unit 14 calculates the control torque value of the motor 6 so that the angle $\theta 1$ of the joint part 4 is made to go back within the allowable angle range R.

Next, when the angle $\theta 1$ of the joint part 4 reaches the predetermined angle $\theta 2$, the angle limit control calculation unit 14 calculates the control torque value of the motor 6 to keep the angle $\theta 1$ of the joint part 4 at the angle $\theta 2$ (S2). As shown in FIG. 3, the predetermined angle $\theta 2$ may be set at an angle at the boundary between the inside and the outside of the allowable angle range R.

As described above, once a person starts the motion to move the knee in one direction, the person cannot immediately stop the motion to move the knee. Therefore, if the control of the joint part 4 is immediately stopped after the angle $\theta 1$ of the joint part 4 reaches the predetermined angle $\theta 2$, the angle $\theta 1$ of the joint part 4 cannot be kept at the angle $\theta 2$. Accordingly, as shown in FIG. 3, the joint part 4 causes the motor 6 to generate torque in the direction opposite to the direction in which the user moves the knee so that the angle $\theta 1$ can be kept at the angle $\theta 2$. At this time, the torque to allow the user to move the knee comes into balance with the torque of the motor 6 when the angle $\theta 1$ of the joint part 4 somewhat exceeds the allowable angle range R.

Figure 5:
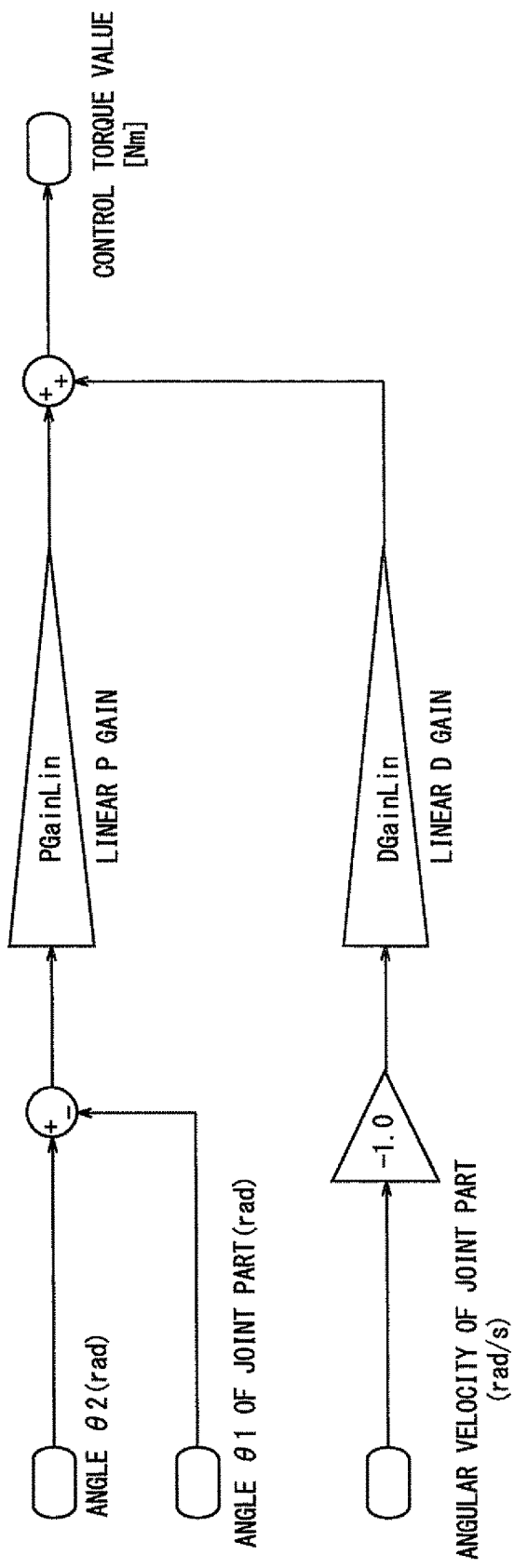
FIG. 5 shows a control model executed in the angle limit control calculation unit.

Now, one example of a control model of the angle limit control calculation unit 14 that achieves the above control will be described. FIG. 5 is a diagram showing a control model executed in the angle limit control calculation unit.

The angle limit control calculation unit 14 according to this embodiment is, as shown in FIG. 5, a typical PD (Proportional-Derivative) controller. More specifically, in the P control system of the angle limit control calculation unit 14, a deviation between the current angle θ1 and the angle θ2 of the joint part 4 is obtained, and the obtained deviation is integrated with a gain. Meanwhile, in the D control system of the angle limit control calculation unit 14, the current angular velocity of the joint part 4 is converted in the direction opposite to that of the angular velocity, and the obtained value is integrated with the gain. The angle limit control calculation unit 14 adds the integrated value in the P control system to the integrated value in the D control system to calculate the control torque value of the motor 6.

The explanation will be back to the angle limit control. Next, the angle limit control calculation unit 14 determines whether the period T has elapsed after the start of the control of the motor 6 to make the angle θ1 of the joint part 4 go back within the allowable angle range R (that is, start of the angle limit control) and determines whether the angle θ1 of the joint part 4 has been made to go back within the allowable angle range R (S3).

When the period T has not elapsed yet after the angle limit control is started or the angle θ1 of the joint part 4 exceeds the allowable angle range R (NO in S3), the angle limit control calculation unit 14 goes back to the process of S2.

Meanwhile, when the period T has elapsed after the angle limit control is started and the angle θ1 of the joint part 4 has been made to go back within the allowable angle range R (YES in S3), the angle limit control calculation unit 14 ends the angle limit control and the process goes back to S1.

As described above, once a person starts the motion to move the knee in one direction, the person cannot immediately stop the motion to move the knee. Therefore, if the control of the joint part 4 is immediately stopped after the angle θ1 of the joint part 4 reaches the predetermined angle θ2, the angle θ1 of the joint part 4 cannot be kept at the angle θ2. Accordingly, the joint part 4 generates torque in the direction opposite to the direction in which the user moves the knee so that the angle θ1 can be kept at the angle θ2. Since the user starts the motion to move the knee back within the allowable angle range R as time proceeds, the direction in which the torque of the motor 6 is generated becomes equal to the direction of the motion in which the user moves the knee back within the allowable angle range R, whereby the angle θ1 of the joint part 4 is made to go back within the allowable angle range R.

When the period T is too short, it is impossible to suppress the occurrence of hunting. On the other hand, when the period T is too long, the angle θ1 of the joint part 4 continues to be kept at the angle θ2. Therefore, the period from the time at which the angle limit control calculation unit 14 starts the angle limit control to the time at which the user starts to move the knee in the reverse direction may be sampled in advance and the period T may be set based on the sampled period.

According to the above operation, the angle limit control can be stopped after the user starts the motion to move the knee back within the allowable angle range R and it is confirmed that the angle θ1 of the joint part 4 has been made to go back within the allowable angle range R. Accordingly, the wearable robot 1 according to this embodiment is able to suppress the occurrence of so-called hunting, whereby it is possible to allow the user to comfortably use the wearable robot.

Second Embodiment

Figure 6:
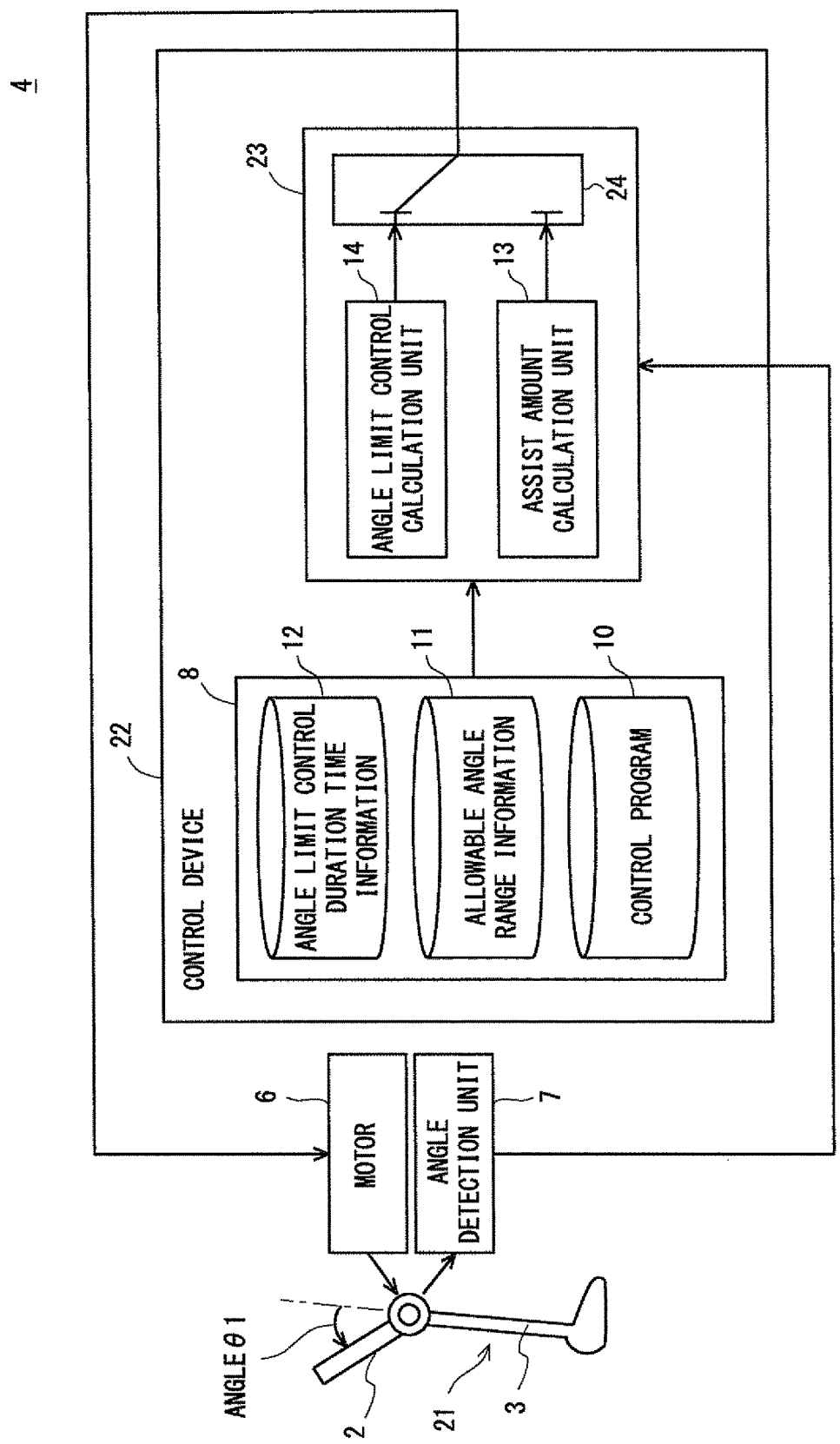
FIG. 6 is a block diagram showing a control system of a wearable robot according to a second embodiment.
Figure 7:
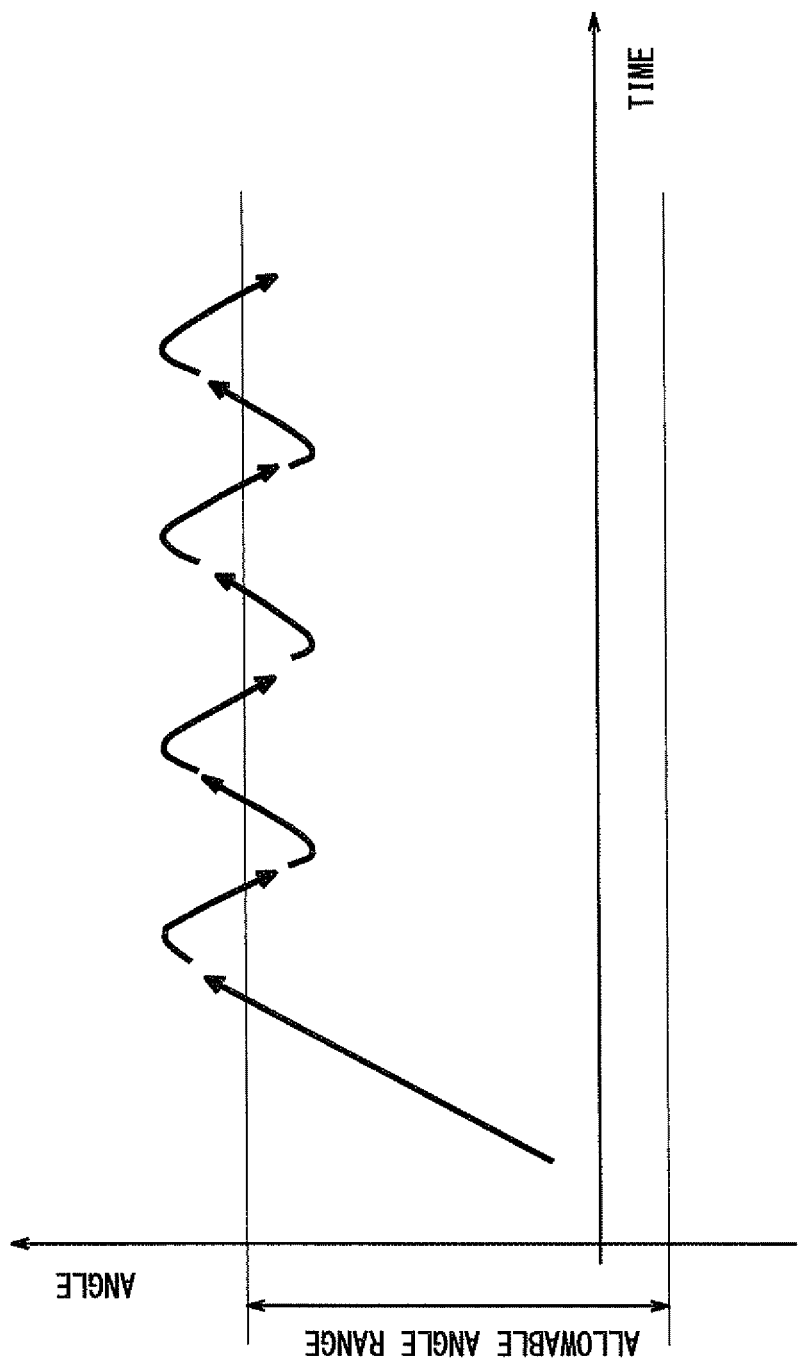
FIG. 7 shows a relation of an angle of a joint part of a wearable robot with respect to time in a wearable robot according to a related art.

A wearable robot according to this embodiment controls the motor 6 by the control torque value calculated in the angle limit control calculation unit 14 without adding the control torque value calculated in the angle limit control calculation unit 14 to the control torque value calculated in the assist amount calculation unit 13 when the angle limit is controlled. FIG. 6 is a block diagram showing a control system of the wearable robot according to this embodiment. Since a wearable robot 21 according to this embodiment has a configuration substantially similar to that of the wearable robot 1 according to the first embodiment, the overlapping descriptions will be omitted and elements of this embodiment which are the same as those of the first embodiment are denoted by the same reference symbols as those of the first embodiment.

As shown in FIG. 6, a calculation unit 23 of a control device 22 in the wearable robot 21 according to this embodiment includes a switch unit 24 in place of the adding unit 15. When the angle limit control calculation unit 14 has started the angle limit control, the calculation unit 23 sets up a flag in the switch unit 24 and controls the motor 6 to cause the motor 6 to generate the control torque value calculated in the angle limit control calculation unit 14. On the other hand, when the angle limit control calculation unit 14 has not started the angle limit control, the calculation unit 23 takes down the flag in the switch unit 24 and controls the motor 6 to cause the motor 6 to generate the control torque value calculated in the assist amount calculation unit 13.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

While the control method is achieved using software resources in the above embodiments, it may be achieved using hardware resources.

For example, while the PD control has been executed in the angle limit control calculation unit 14 in the above embodiments, a PID (Proportional-Integral-Derivative) control or a state feedback control may be executed in place of the PD control.

What is claimed is:

1. A method for controlling a wearable robot that is attached to a joint part of a user, comprising:
   controlling a robot joint, when an angle of the robot joint is detected to exceed a predetermined allowable angle range, by generating a torque to cause the angle of the robot joint to go back within the predetermined allowable angle range,
   wherein, when the robot joint is controlled to make the angle of the robot joint go back within the predetermined allowable angle range and the angle of the robot joint reaches a predetermined angle, controlling the torque in the robot joint to keep the angle of the robot joint at the predetermined angle for a non-zero predetermined period of time while suppressing oscillation in the robot joint.

2. The method for controlling the wearable robot according to claim 1, wherein the predetermined angle is an angle at a boundary between an inside and an outside of the allowable angle range.

* * * * *